United States Patent
Yamashita

(10) Patent No.: US 6,449,890 B1
(45) Date of Patent: Sep. 17, 2002

(54) DISPLAY ELEMENT LIGHTING METHOD AND DISPLAY DEVICE

(75) Inventor: Syunichi Yamashita, Tokyo (JP)

(73) Assignee: NEC Infrontia Corporation, Kawasaki (JP)

( * ) Notice: Subject to any disclaimer, the term of this patent is extended or adjusted under 35 U.S.C. 154(b) by 0 days.

(21) Appl. No.: 09/618,098

(22) Filed: Jul. 17, 2000

(30) Foreign Application Priority Data

Jul. 21, 1999 (JP) .......................................... 11-206462

(51) Int. Cl.[7] .............................................. G09F 19/00
(52) U.S. Cl. ........................................ 40/582; 40/546
(58) Field of Search ..................... 40/546, 547, 582; 362/31, 26, 298, 300, 301, 812

(56) References Cited

U.S. PATENT DOCUMENTS

| | | | | |
|---|---|---|---|---|
| 2,297,851 A | * | 10/1942 | Wyss ........................... | 40/546 |
| 2,524,657 A | * | 10/1950 | Ford ........................... | 40/456 |
| 2,646,637 A | * | 7/1953 | Nierenberg et al. ............ | 40/546 |
| 3,131,496 A | * | 5/1964 | Schropp ...................... | 362/32 |
| 3,486,261 A | * | 12/1969 | Hardesty ..................... | 362/32 |
| 4,285,889 A | * | 8/1981 | Parsons ....................... | 40/456 |
| 4,575,783 A | * | 3/1986 | Hammond .................. | 362/145 |
| 4,811,507 A | * | 3/1989 | Blanchet ...................... | 40/456 |
| 4,918,578 A | * | 4/1990 | Thompson ................... | 362/31 |
| 5,219,217 A | * | 6/1993 | Aikens ......................... | 362/32 |
| 5,227,773 A | * | 7/1993 | Wu et al. ...................... | 40/456 |
| 5,434,755 A | * | 7/1995 | Corathers et al. ............. | 362/32 |
| 5,499,165 A | * | 3/1996 | Holmes, Jr. ................... | 362/31 |
| 5,915,855 A | * | 6/1999 | Murase et al. ................ | 40/546 |
| 6,026,602 A | * | 2/2000 | Grondal et al. ............... | 40/570 |
| 6,123,442 A | * | 9/2000 | Freier et al. ................. | 362/559 |

FOREIGN PATENT DOCUMENTS

| | | |
|---|---|---|
| JP | 6-28837 | 4/1994 |
| JP | 7-49496 | 2/1995 |
| JP | 10-314424 | 2/1998 |
| JP | 10-207406 | 8/1998 |
| JP | 11-86622 | 3/1999 |

* cited by examiner

Primary Examiner—Christopher P. Schwartz
Assistant Examiner—Devon Kramer
(74) Attorney, Agent, or Firm—Foley & Lardner

(57) ABSTRACT

An object of the invention of the present application is to provide a display element lighting method in which light is used efficiently and display properties can be improved while electric power consumption needed for lighting the display element can be decreased, and a display device; in order to achieve the object, the present invention provide a display element lighting method, which has a display surface and a back surface opposite to the display surface, and comprises picture elements which can transmit or block light respectively, comprising the steps of: lighting the display surface by a first light and natural light; and lighting the back surface by a second light.

15 Claims, 3 Drawing Sheets

DISPLAY ELEMENT LIGHTING METHOD AND DISPLAY DEVICE

BACKGROUND OF THE INVENTION

1. Field of the Invention

The present invention relates to a display element lighting method and a display device. More particularly, the present invention relates to a display element lighting method comprising the step of lighting a display element comprising picture elements which can transmit or block light respectively by natural light together with lighting the display element by incident light from a display surface side and a back surface side of the display element, and a display device.

This application is based on Japanese Patent Application No. Hei 11-206462, the contents of which are incorporated herein by reference.

2. Description of the Related Art

A conventional display device provided with a display element having a shutter function per picture element, that is, a conventional display device provided with a display element comprising picture elements which can transmit incident light from a display surface side or block respectively is wel-known.

The following three methods have been suggested as a lighting method for the display element. The first lighting method comprises the step of lighting the display element by incident natural light from a display surface side of the display element together with lighting the display element by reflected light by a reflection surface attached to the opposite surface of the display element with respect to the display surface which transmit illumination light. The second lighting method comprises the step of lighting the display element by light from a light source arranged on the opposite surface of the display element with respect to the display surface. The third lighting method combines the first and second lighting methods by using the reflection surface attached to the opposite surface of the display element with respect to the display surface used in the first lighting method is used as a semi-transparent reflection plate.

The first lighting method is disclosed, for example, in Japanese Patent Application, First Publication No. Hei 11-86622. Moreover, the second lighting method is disclosed in Japanese Patent Application, First Publication No. Hei 07-049496, for example.

However, the first lighting method has the problem that when the display device is in dark, it is difficult to confirm the display contents at the display surface. In other words, incident light at the display surface of the display element attenuates whenever the light is reflected by the display element. Therefore, when the intensity of natural light is small, the light attenuates in the display element and the difference in the light and shade of the picture elements at the display surface is difficult to confirmed.

The second lighting method also has the problem that the light source must be lit while the display device is in use.

The intensity of the incident light is compensated in the third lighting method, and the electric power consumption is made low in the third lighting method. Therefore, it is impossible to increase the intensity of light from the light source. In addition, the display element is lit by light led from the light source into the display surface or the back surface of the display element in the third lighting method; therefore, it is also impossible to light the display element efficiently. Then, it is impossible to light the display element efficiently, and the superior visibility of the contents displayed at the display surface cannot be obtained where the display device is used in illuminated conditions.

It is therefore an object of the present invention to provide a display element lighting method in which light is used efficiently and display properties can be improved while electric power consumption needed fo[00f8] lighting the display element can be decreased, and a display device.

SUMMARY OF THE INVENTION

According to an aspect of the present invention, the present invention provides a display element lighting method, which has a display surface and a back surface opposite to the display surface, and comprises picture elements which can transmit or block light respectively, comprising the steps of:

lighting the display surface by a first light produced by a light source and natural light; and lighting the back surface by a second light produced by a light source.

According to the display element lighting method, the display element is lit uniformly by the first light produced by a light source and the second light produced by a light source, from the display surface and the back surface. Thereby, the weakness of the intensity of natural light and the attenuated intensity of natural light is compensated. In addition, when the display device is used in dark conditions, it is possible to produce light having a sufficient intensity to display picture images in the display element. Furthermore, when the intensity of the light produced by the light source is adjusted in response to the intensity of natural light, not only the electric power consumption of the display device can be more decreased, but clear picture images can be produced, independently of the intensity of natural light.

Moreover, the electric power consumption can be decreased, compared with the electric power consumption of the display device in which the display element is lit by either the display surface side or the back surface side When the first light and the second light are produced respectively by first and second light sources, it is possible to adjust respectively the intensity of light produced from the first light source and the second light source. Therefore, it is also possible to use efficiently lights, and improve the picture; properties of picture images, in addition to the decrease of the electric power consumption of the display device.

According to another aspect of the present invention, the present invention provides a display device display device comprising:

a display element having a display surface and a back surface opposite to the display surface and comprising picture elements which can transmit or block light respectively;

a first lighting device for lighting the display surface by a first light produced by a light source; and a second lighting device for lighting the back surface by a second light produced by a light source.

According to the display device, it is possible to easily carry out the display element light method having excellent effects explained above.

In particular, when the second lighting device comprises a light leading plate having a reflection surface parallel to the display surface, and reflecting by the reflection surface or transmitting the light produced by the light source, and a second reflector which reflects the light transmitting through the light leading plate to the display surface, the light transmitting through the light leading plate can be used to light the display element. Therefore, the light produced by the light source can be used efficiently. Thereby, the electric power consumption of the display device can be decreased.

DESCRIPTION OF THE PREFERRED EMBODIMENT

Embodiments of the display element lighting method and the display device according to the present invention will be explained referring to Figures.

EXAMPLE 1

Figure 1:
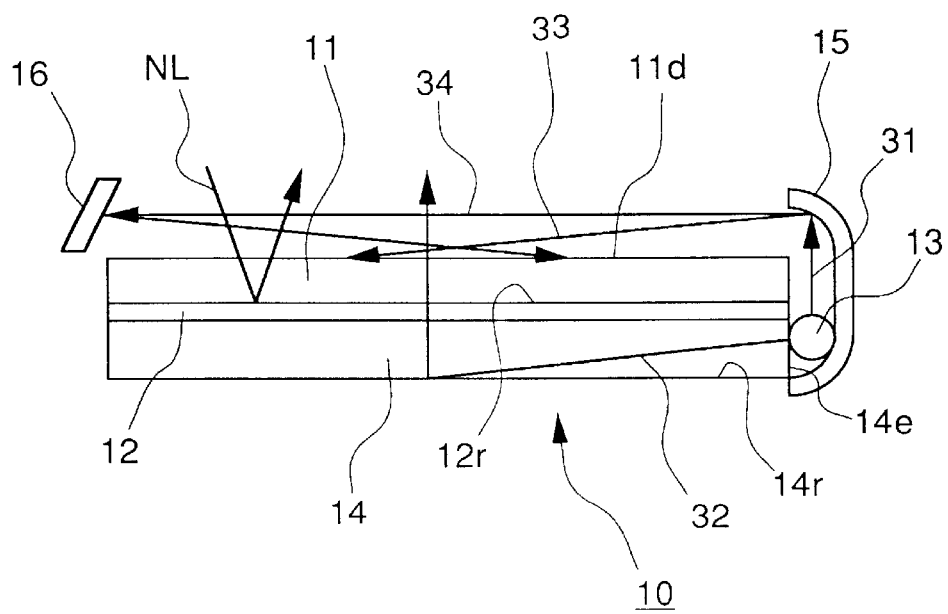
FIG. 1 shows the display device of the Example 1 according to the present invention.
Figure 2:
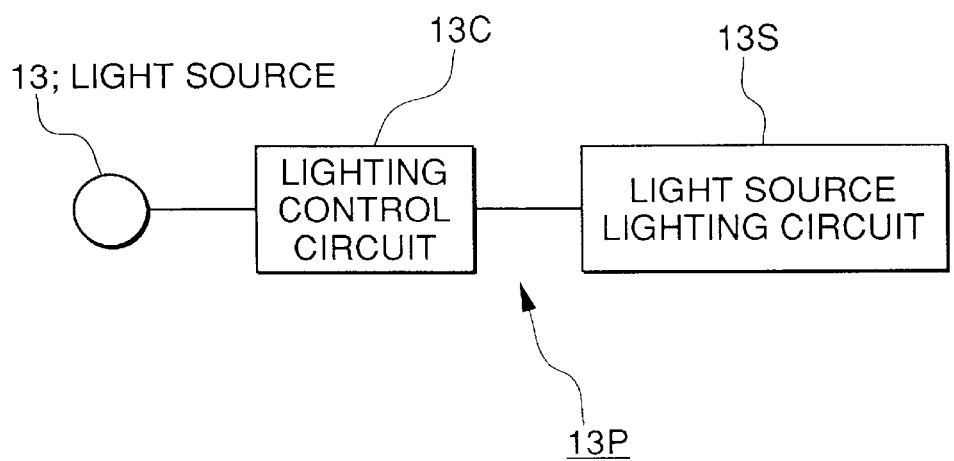
FIG. 2 shows the feeder circuit to the light source provided in the display device shown in FIG. 1.

The display device 10 shown in FIG. 1 comprises the display element 11, the semi-transparent reflection plate 12, the light source 13, the light leading plate 14, the reflector (reflection element) 15, and the reflection plate 16. Moreover, the feeder circuit 13P to the light source 13 comprises the lighting control circuit 13C and the light source lighting circuit 13S, as shown in FIG. 2.

The display element 11 is a non-lighting type display element having a shutter function per picture element, that is, a non-lighting type display element comprising picture elements which can individually transmit or block light incident in the display element 11. For example, the display element 11 comprises a liquid crystal. When the display element 11 comprises a liquid crystal, transparent electrodes (not shown in FIGS.) are attached to both sides of the liquid crystal at which the picture elements are provided. Furthermore, the transparent electrodes are connected the voltage applying circuit (not shown in FIGS.) for applying voltage between the transparent electrodes. The voltage changes the transmission and the obstructing of the incident light in the liquid crystal through the transparent electrode.

The semi-transparent reflection plate 12 is attached to the opposite surface of the display element 11 with respect to the display surface. The semi-transparent reflection plate 12 reflects the light transmitting through the display element 11 into the display element 11, and transmits the light incident from the light leading plate 14, and is made the light be incident in the display element 11.

The light source 13 is fixed at the end face 14e of the light leading plate 14 at which is an enclosure (not shown in FIGS.) of the display area provided in the display element 11. The light source 13 produce s the first light 31 and the second light 32. The first light 31 is used to light the display element 11 from the display surface. The second light 32 is used to light the display element 11 from the back surface. Moreover, the lighting control circuit 13C connected to the light source 13 adjusts the electric power supplied to the light source 13. The light source lighting circuit 13S turns on and off the light source 13 by switching on and off the switch (not shown in FIGS.) thereof.

The light leading plate 14 comprises the reflection surface 14r which is parallel to the display surface 11d of the display element 11, and the end face 14e which is substantially perpendicular with respect to the reflection surface 14r. The light leading plate 14 is attached to the opposite surface of the semitransparent reflection plate 12 with respect to the reflection surface 12r. The light leading plate 14 reflects the second light 32 incident through the end face 14e from the light source 13 at the reflection surface 14r, and uses the second light 32 to light the display element 11. The display element 11, the semi-transparent reflection plate 12, and the light leading plate 14, which are attached each other, are fixed by the enclosure not shown; in FIGS. provided in the display device 10.

The reflector 15 reflects the first light 31 from the light source 13, and produces the third light 33 and the fourth light 34. The third light 33 is used to light the most of the area of the display surface 11d, which is near the reflector 15. On the basis of the experimental results, when the display element 11 is lit by the third light 33, it is most preferable to light the area of the display surface 11d; of which the width is two thirds from the right end in the longitudinal direction of the display surface 11d in FIG. 1. The reflector 15 is fixed to an enclosure which is not shown in FIG. 1 provided in the display device 10.

The reflection plate 16 is arranged in the opposite side with respect to the reflector 15. The fourth light 34 reflected by the reflection plate 16 is used to light the most of the area of the display surface 11d, which is near the reflector 16. On the basis of the experimental results, when the display element 11 is light by the fourth light 34, it is most preferable to light the area of the display surface 11d, of which the width is two thirds from the left end in the longitudinal direction of the display surface 11d in FIG. 1. The reflection plate 16 is fixed to the enclosure which is not shown in FIG. 1 provided in the display device 10.

Below, the action of the display device 10 of this Example will be explained with reference to the FIGS. 1 and 2. Moreover, the display device 10 comprises liquid crystal as the display element 11.

First, the action of the display device 10 used in sufficiently illuminated conditions will be explained. In this case, the power switch of the light source lighting circuit 13S is opened. Moreover, the display element 11 is lit by natural light NL from the display surface 11d. The natural light NL transmits through the display surface 11d, is incident in the display element 11, is reflected by the reflection surface 12r of the semi-transparent reflection plate 12, and returns toward the display surface 11d.

The transparent electrodes are attached on the liquid crystal. Specifically, the transparent electrodes are attached so as to produce one character, a series of characters, or a plurality of picture images. When voltage is applied to the transparent electrodes, the liquid crystal changes, and transmits or blocks the light incident in the liquid crystal. The area of the transparent electrodes applied with voltage that changes liquid crystal so as to transmit light becomes dark, that is, is recognized as a black area. In contrast, the area of the transparent electrodes applied with voltage that changes liquid crystal so as to block light is bright, that is, is recognized as a white area. One character, a series of characters, or a plurality of picture images is displayed at the display surface 11d by the contrast between the black area and the white area. Thereby, it is possible to display the contents desired on the display surface 11d of the display device 10.

Next, the action of the display device 10 used in relatively dark conditions will be explained. In this case, the power switch of the light source lighting circuit 13S is closed. In order to light the display element 11 in response to a degree of darkness, the lighting control circuit 13C works automatically or manually.

When the power switch of the light source lighting circuit 13S is closed, the lighting control circuit 13C operates, and the first light 31 and the second light 32 are produced from the light source 13.

Moreover, natural light NL is incident in the display surface 11d of the display element 11 besides the first light 31 and the second light 32, similarly in the sufficient bright conditions. That is, natural light NL is incident in the display element 11 from the display surface 11d. Therefore, the action of the display device 10 to natural light NL will be briefly.

The first light 31 from the light source 13 is reflected by the reflector 15, and produces the third light 33 and the fourth light 34. The third light 33 lights the most of the area of the display surface 11d, which is near the reflector 15 from the display surface side. The fourth light 34 is reflected by the reflection plate 16, and lights the most of the area of the display surface 11d, which is near the reflection plate 16, from the display surface side.

Moreover, the second light 32 from the light source 13 is incident in the light leading plate 14 through the end face 14e, reflected by the reflection surface 14r, and lights the display element 11.

The light incident in the display element 11 from the back surface, that is, the opposite surface of the display element 11 with respect to the display surface 11d comprises natural light NL reflected by the reflection surface 12r and the second light 32 reflected by the reflection surface 14r.

In contrast, the light incident in the display element 11 from the display surface side comprises natural light NL, the third light 33 which is reflected by the reflector 15 and lights the most of the area near the reflector 15 on the display surface 11d, and the fourth light 34 which is reflected by the reflection plate 16 and lights the most of the area near the reflector 15 on the display surface 11d. The display element 11 is lit uniformly by the third light 33 and the fourth light 34.

As explained above, the display element 11 is lit by two kinds of light, that is, the light incident from the display surface side and the back surface side.

The front surface of the display is illuminated by light that originates at light source 13 and is reflected off the reflector 15 and reflector 16. This is an example of a first lighting device that directs light so as to be incident on the display surface.

FIG. 1 also shows that light from the light source 13 enters the side of a light leading plate 14 and is reflected off of a reflecting surface 14r so as to pass through a semi-transparent reflection plate 12 of a second lighting device and to be incident on the back surface of the display. This is an example of the second lighting device.

FIG. 1 also shows natural light NL (ambient light) entering the display element through the display surface and being reflected by a reflecting surface 12r of the semitransparent reflective plate 12.

Thus, in FIG. 1 it is seen that the light incident on the rear of the semitransparent reflective plate 12 passes through the plate, while light incident on the front of the semitransparent reflective plate 12 is reflected by the plate. While FIG. 1 illustrates this reflection occurring for natural light, it will be understood that light from the first lighting device that is incident on the-front surface of the display will also be reflected if it reaches the reflecting surface 12r. Thus, reflecting light entering the display through the display surface by the second lighting device pertains to the reflection of natural light that enters the display, and may also pertain to light from the first lighting device that passes through the display.

When the display element 11 is lit from both sides thereof, and the voltage is applied to the transparent electrodes attached on the liquid crystal, the display surface 11d of the display device 10 displays the contents desired to display, similarly to the display device 10 in the illuminated conditions.

When the intensity of natural light NL is weak, in order to compensate the weakness of the intensity of natural light NL and the attenuated intensity of natural light NL by transmitting through the display element 11 and the semi-transparent reflection plate 12, the display element 11 is lit by the light produced by the light source 13 from the display surface side and the back surface side in the display device 10 of this Example. Therefore, it is possible to improve the use efficiency of the light produced by the light source 13. Then, the display element 11 is lit by the light having a sufficient intensity for displaying the picture image clearly in the display element 11. The displaying properties of picture image can be improved.

Moreover, when the use efficiency of the light is improved, the electric power consumption of the display device 10 of this Example can be decreased, compared with the electric power consumption of the display device 10 in which the display element 11 is lit by either the display surface side or the back surface side. Furthermore, when the intensity of the light produced by the light source 13 is adjusted in response to the intensity of natural light NL, not only the electric power consumption of the display device 10 can be more decreased, but clear picture images,can be produced, independently of the intensity of natural light NL.

EXAMPLE 2

Figure 3:
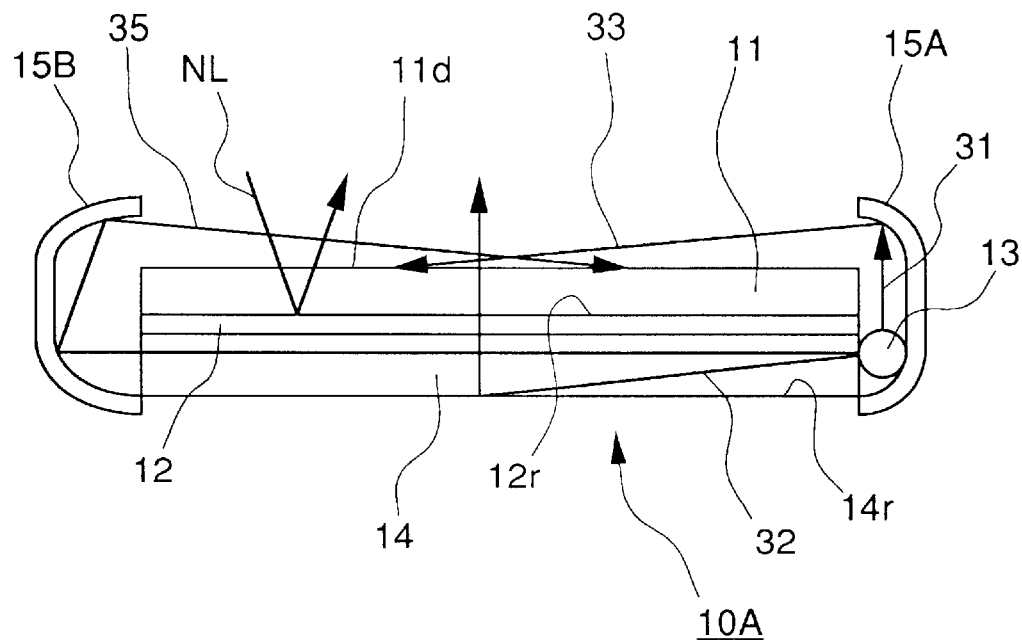
FIG. 3 shows the display device of the Example 2 according to the present invention.

FIG. 3 shows the display device 10A of this Example. The display element 11 is lit by the light through two routes from the display surface side in the Example 1. In contrast, the display element 11A of this Example is lit by the light through two routes from the display surface side, of which one is different from the route in the Example 1. Specifically, the first reflector 15A is used to light the most of the area of the display surface 11d, which is near the first reflector 15A. The second reflector 15B is used to replace the reflection plate 16 in the Example 1, and lights the most of the area of the display surface 11d, which is near the second reflector 15B.

The second reflector 15B is arranged on the display surface 11d in the opposite side to the first reflector 15A. The second reflector 15B reflects the fifth light 35, which is produced by the light source 13 and transmits through the light leading plate 14, twice at the inner surface thereof. The fifth light 35 lights the most of the area of the display surface 11d, which is near the second reflector 15B.

Below, the action of the display device 10A of this Example will be explained with reference to the FIG. 3.

The second and third lights 32 and, 33 light the display element 11, similarly in the Example 1. In other words, the third light 33 reflected by the first reflector 15A lights the most of the area of the display surface 11d, which is near the first reflector 15A from the display surface side. The second light 32 reflected by the reflection surface 14r lights the display element 11 from the back surface side.

As explained above, the second light 32 reflected by the reflection surface 14r of the light leading plate 14 is used to light the display element 11. However, the light transmitting through the light leading plate 14 is not used to light the display element.

In this Example, in order to use efficiently light incident through the light leading plate 14, the fifth light 35, which transmits through the light leading plate 14 and is reflected by the second reflector 15B twice, is used to light the most of the area of the display surface 11d, which is near the second reflector 15B from the surface side. The fifth light 35 lights uniformly the display element 11 together with the third light 33 which is reflected by the first reflector 15A.

In this Example, the third light 33 reflected by the first reflector 15A lights the most of the area of the display surface 11d, which is near the first reflector 15A from the display surface side. In addition, the fifth light 35, which is reflected by the second reflector 15B twice, lights the most of th[0085] area of the display surface 11d, which is near the second reflector 15B from the surface side. Furthermore, the second light 32 reflected by the reflection surface 14r lights the display element 11 from the back surface side.

According to the display device 10A in this Example, it is possible to use efficiently light using two reflectors 15A and 15B. The use efficiency of light is further improved, and the picture properties of the picture images are also improved.

Moreover, the electric power consumption of the display device 10A of this Example can be decreased, compared with the electric power consumption of the display device in which the display element 11 is lit by either the display surface side or the back surface side. Furthermore, when the intensity of the light produced by the light source 13 is adjusted in response to the intensity of natural light NL, not only the electric power consumption of the display device 10A can be more decreased, but clear picture images can be produced, independently of the intensity of natural light NL.

EXAMPLE 3

Figure 4:
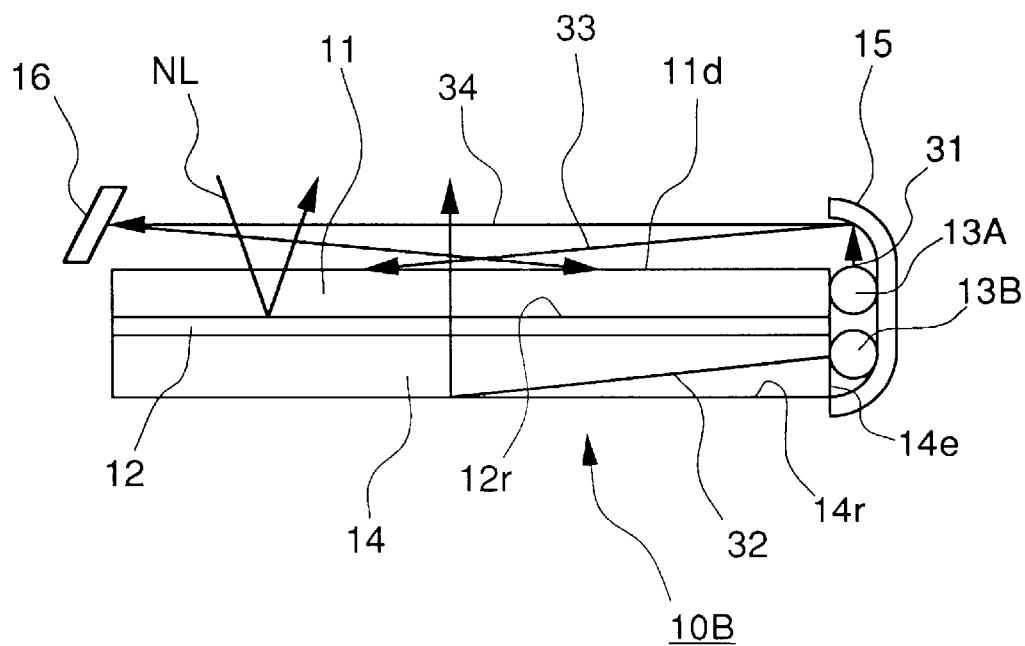
FIG. 4 shows the display device of the Example 3 according to the present invention.
Figure 5:
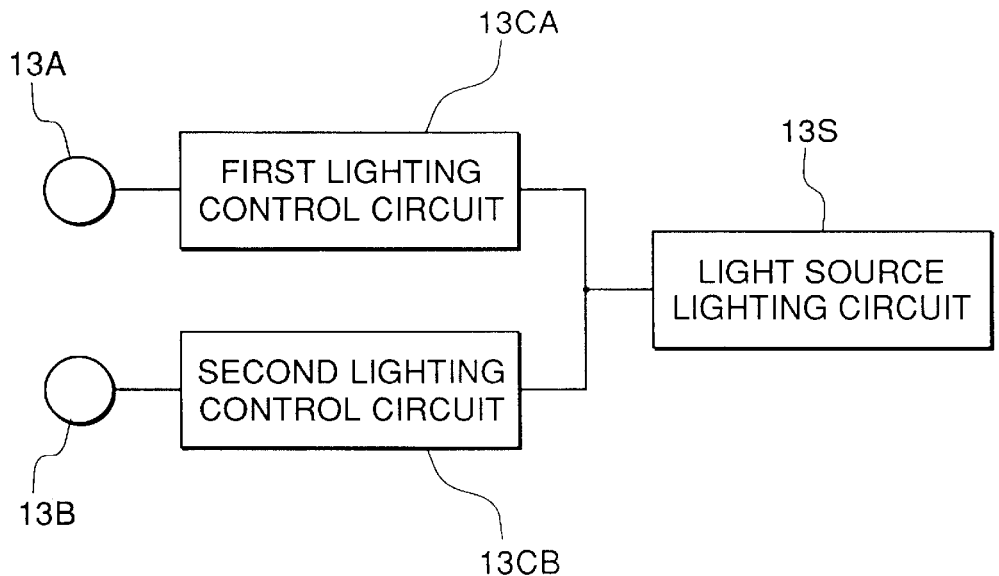
FIG. 5 shows the feeder circuit to the light source provided in the display device shown in FIG. 4.

FIG. 4 shows the display device 10B, of this Example. FIG. 5 shows the feeder circuit to the light sources 13A and 13B provided in the display device 10B shown in FIG. 4.

The light source 13 in the Example 1 produces the light lighting the display element 11 from the surface side and the back surface side. In contrast, two light sources 13A and 13B are used to light the display element 11 from the surface side and the back surface side respectively in this Example. In other words, the first light source 13A produces the first light 31 which becomes the third light 33 and fourth light 34 by reflection. The second light source 13B produces the second light 32. The first and second light 31 and 32 are respectively adjusted. Specifically, the first light source 13A is connected the light source lighting circuit 13S, via the first lighting control circuit 13CA, as shown in FIG. 5. The second light source 13B is also connected the light source lighting circuit 13S, via the second lighting control circuit 13CB, as shown in FIG. 5.

Below, the action of the display device 10B of this Example will be explained with reference to the FIGS. 4 and 5.

The third and fifth lights 33 and 34, which are produced and adjusted the intensity of light by the first light source 13A, the light source lighting circuit 13S, and the first lighting control circuit 13CA, light the display element 11 from the display surface side. The second light 32, which is produced and adjusted the intensity of light by the second light source 13B, the light source lighting circuit 13S, and the second lighting control circuit 13CB, lights the display element 11 from the back surface side.

According to the display device 10B in this Example, the intensity of the third and fourth light 33 and 34 which lights the display element 11 from the surface side, and the intensity of the second light 32 which lights the display element 11 from the back surface side are respectively adjusted and thereby the display element 11 is uniformly lit. Moreover, it is possible to compensate the weakness of the intensity of natural light NL and the attenuated intensity of natural light NL by transmitting through the display element 11 and the semi-transparent reflection plate 12. Therefore, it is possible to produce light having a sufficient intensity to display picture images in the display element 11, in response to the use conditions of the display device 10B. In other words, it is possible to adjust respectively the intensity of light produced from the first light source 13A and the second light source 13B. Therefore, it is also possible to use efficiently lights, and improve the picture properties of picture images, in addition to the decrease of the electric power consumption of the display device 10B.

EXAMPLE 4

Figure 6:
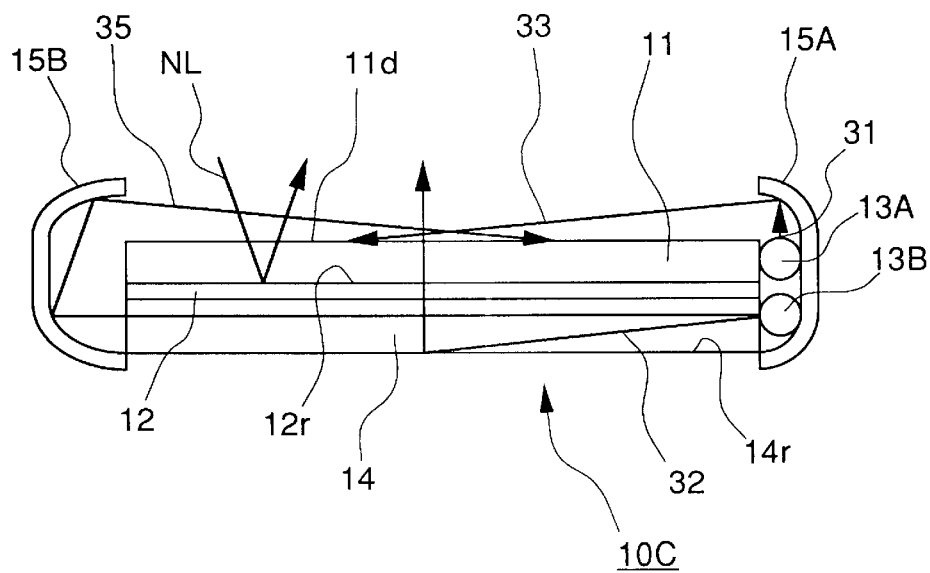
FIG. 6 shows the display device of the Example 4 according to the present invention.

FIG. 6 shows the display device 10C of this Example. The display element 11 is lit by the light through two routes from the display surface side in the Example 1. Moreover, one light source 13 is used to light the display element 11 in the Example 1. In contrast, the display element 11C of this Example is lit by the light through two routes from the display surface side, of which one is different from the route in the Example 1. Moreover, two light sources 13A and 13B are used to light the display element 11 in this Example.

In other words, the first reflector 15A is used to light the most of the area of the display surface 11d, which is near the first reflector 15A. The second reflector 15B is used to replace the reflection plate 16 in the Example 1, and lights the most of the area of the display surface 11d, which is near the second reflector 15B. Moreover, the second reflector 15B is arranged on the display surface 11d in the opposite side with respect to the first reflector 15A. The first light source 13A produces the third light 33 which lights the display element 11 from the display surface side. The second light source 13B produces the second light 32 which light the display element 11 from the back surface side and the fifth light 35 which lights the display element 11 from the display surface side.

As shown in FIG. 5, the first light source 13A is connected the light source lighting circuit 13S, via the first lighting control circuit 13CA. The second light source 13B is also connected the light source lighting circuit 13S, via the second lighting control circuit 13CB, as shown in FIG. 5.

Below, the action of the display device 10C of this Example will be explained with reference to the FIGS. 5 and 6.

The first light 3, which is produced and adjusted the intensity of light by the first light source 13A, the light source lighting circuit 13S, and the first lighting control circuit 13CA, is reflected by the first reflector 15A and produces the third light 33. The third light 33 lights the most of the area of the display surface 11d, which is near the first reflector 15A from the display surface side. The second light source 13B produces the second light 32 and the fifth light 35. The second light 32, which is produced by the second light 32 and reflected by the reflection surface 14r, lights the display element 11, from the back surface side.

As explained above, the light transmitting through the light leading plate 14 is not used to light the display element. In this Example, in order to use efficiently light incident through the light leading plate 14, the fifth light 35, which transmits through the light leading plate 14 and is reflected by the second reflector 15B twice, is used to light the most of the area of the display surface 11d, which is near the second reflector 15B from the surface side. Thereby, the display element 11 is lit uniformly from the display surface side by the fifth light 35 together with the third light 33.

The display element 11 is lit by the third light 33 and the fifth light 35 from the display surface side, and the second light 32 from the back surface side.

According to the display device 10C in this Example, the light lighting the display element 11 from the surface side and the light lighting the display element 11 from the back surface side are respectively adjusted. Moreover, in order to use efficiently light, the second reflector 15B reflects the light transmitting through the light leading plate 14. Thereby, the display element 11 is uniformly lit. Therefore, it is possible to compensate the weakness of the intensity of natural light NL and the attenuated intensity of natural light NL by transmitting through the display element 11 and the semi-transparent reflection plate 12. Therefore, it is possible to produce light having a sufficient intensity to display picture images in the display element 11, in response to the use conditions of the display device 10C. That is, it is possible to adjust respectively the intensity of light produced from the first light source 13A and the second light source 13B. Therefore, it is possible to use efficiently light, and improve the picture properties of picture images, in addition to the decrease of the electric power consumption of the display device 10C.

The present invention is not limited to the above embodiments, and can change of design when the change does not depart from the present invention. For example, the devices 10, 10A, 10B, and 10C in the Examples 1 to 4 displays black and white; however, may display colors. In addition, the lighting control circuit 13C may not be provided in the display device devices 10, 10A, 10B, and 10C.

What is claimed is:

1. A lighting method for a display having a display surface and a back surface opposite to the display surface, and having picture elements which can transmit or block light respectively, the method comprising:
   directing light by a first lighting device so as to be incident on the display surface from outside of the display;
   directing light by a second lighting device so as to be incident on the back surface from outside the display; and
   reflecting light entering through the display surface by said second lighting device.

2. A display element lighting method according to claim 1, wherein said first lighting device and second lighting device share a single light source.

3. A display element lighting method according to claim 1, wherein said first lighting device and second lighting device comprise respective first and second light sources.

4. A display element lighting method according to claim 1, wherein said first and second lighting devices are powered by a power supply that is adjusted in accordance with an amount of ambient light.

5. A display device comprising:
   a display element having a display surface and a back surface opposite to the display surface and comprising picture elements which can transmit or block light respectively;
   a first lighting device for directing light so as to be incident on the display surface from outside of the display; and
   a second lighting device for directing light so as to be incident on the back surface from outside of the display, and for reflecting light entering the display element through the display surface.

6. A display device according to claim 5, wherein
   said display element is in a rectangular shape having said display surface, said back surface and first and second end surfaces perpendicular to the display surface side;
   said first lighting device and said second lighting device share a single light source;
   said first lighting device comprises a reflection plate which is arranged in the second surface side and reflects light to the display surface, and a reflector which is arranged in the first end surface side and reflects the light from the light source to the display surface and the reflection plate;
   said second lighting device comprises a light leading plate which is arranged on the back surface, comprises a reflection surface parallel to the display surface and end surfaces perpendicular to the reflection surface, and reflects the light incident through the end surface from the light source by the reflection surface to the display element.

7. A display device according to claim 5, wherein said first and second lighting devices comprise respective first and second light sources.

8. A display device according to claim 5, wherein
   said display clement is in a rectangular shape having said display surface, said back surface, and first and second end surfaces perpendicular to the display surface side;
   said first lighting device and said second lighting device share a single light source;
   said first lighting device comprises a first reflector which is arranged in the first end surface side and reflects the light from the light source to the display surface; and
   said second lighting device comprises a light leading plate having a reflection surface parallel to the display surface, and first and second end surfaces perpendicular to the reflection surface and reflecting by the reflection surface or transmitting through the second end surface the light, which is produced by the light source, is incident through the first end surface, and transmits thereinto, and a second reflector which reflects the light transmitting through the second end surface of the light leading plate to the display surface.

9. A display device according to claim 5, wherein said first and second lighting devices comprise at least one light adjuster for adjusting the light produced by said first and second lighting devices by adjusting electric power supplied to a light source in accordance with an amount of ambient light.

10. A liquid crystal display device comprising:
    a liquid crystal display panel including display elements for selectively transmitting light therethrough;
    a first lighting device for directing light so as to be incident on a display surface of the display panel from outside the display panel; and
    a second lighting device comprising a semi-transparent plate and a light leading plate, the semi-transparent plate being arranged on a back-surface of the display panel for reflecting light entering the display element through the display surface, and the light leading plate being arranged on a back surface of the semi-transparent plate for directing light entering an end surface of the light leading plate so as to be incident on the back surface of the display panel from outside the display panel.

11. The liquid crystal display device claimed in claim 10, wherein the first lighting device comprises a first reflector arranged to direct light from a light source toward the display surface and toward a second reflector, the second reflector in turn directing light from the first reflector toward the display surface, and wherein the light leading plate of the second lighting device directs light from the light source entering an end surface of the light leading plate so as to be incident on a back surface of the display panel.

12. The liquid crystal display device claimed in claim 10, wherein the first lighting device comprises a first reflector that directs light from a light source toward the display surface, and wherein the light leading plate of the second lighting device directs light from the light source entering a first end surface of the light leading plate so as to be incident on a back surface of the display panel, and a first reflector of the second lighting device directs light leaving a second end surface of the light leading plate toward the display surface.

13. The liquid crystal display device claimed in claim 10, wherein the first lighting device comprises a first reflector arranged to direct light from a first light source toward the display surface and toward a second reflector, the second reflector in turn directing light from the first reflector toward the display surface, and wherein the light leading plate of the second lighting device directs light from a second light source entering an end surface of the light leading plate so as to be incident on a back surface of the display panel.

14. The liquid crystal display device claimed in claim 10, wherein the first lighting device comprises a first reflector that directs light from a first light source toward the display surface, and wherein the light leading plate of the second lighting device directs light from a second light source entering a first end surface of the light leading plate so as to be incident on a back surface of the display panel, and a first reflector of the second lighting device directs light leaving a second end surface of the light leading plate toward the display surface.

15. The liquid crystal display device claimed in claim 10, further comprising a light adjusting circuit for adjusting power supplied to one or more light sources associated with the first and second lighting devices to control light output of the one or more light sources in accordance with an amount of ambient light.

* * * * *